United States Patent
Dyer

[15] 3,664,184
[45] May 23, 1972

[54] ROTARY TORQUE INDICATOR FOR WELL DRILLING APPARATUS

[72] Inventor: Norman D. Dyer, Dallas, Tex.
[73] Assignee: Dresser Industries, Inc., Dallas, Tex.
[22] Filed: Sept. 14, 1970
[21] Appl. No.: 71,712

[52] U.S. Cl............................73/136 A, 73/136 B, 73/136 D
[51] Int. Cl. ..........................................................G01l 3/10
[58] Field of Search..................73/133, 136 R, 136 A, 136 B, 73/136 C, 136 D, 139, 88.5, 151; 175/40, 50

[56] References Cited

UNITED STATES PATENTS

| | | | |
|---|---|---|---|
| 2,651,197 | 9/1953 | Crookston et al.....................73/136 D |
| 3,000,208 | 9/1961 | Piazza, Jr.............................73/136 A |
| 3,134,279 | 5/1964 | Sims et al...........................73/136 A X |
| 3,350,944 | 11/1967 | Michele..........................73/136 A UX |

FOREIGN PATENTS OR APPLICATIONS

| | | | |
|---|---|---|---|
| 984,540 | 2/1965 | Great Britain........................73/136 A |
| 997,723 | 7/1965 | Great Britain........................73/136 A |

Primary Examiner—Charles A. Ruehl
Attorney—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

The device is used to indicate torque applied by the rotary table to the drill string during drilling of oil and gas wells. Intermediate adapter between the Kelly bushing and the rotary table in one embodiment has two parts. Lower part of adapter includes standard male square drive that fits into the square drive of the rotary table, and is thus rotated by the rotary table. Upper part of adapter includes female square drive arranged to receive male square drive on the Kelly. The Kelly transmits torque from adapter assembly to the drill pipe. Upper part is connected to lower part by either hydraulic cylinders or by linkage with strain gauge. The upper part rotates with lower part, but is movable relative thereto to indicate relative torque between upper and lower parts. RF transmitter connected to the hydraulic cylinder or strain gauge provides torque signal to remote RF receiver. Alternative embodiment has unitized adapter assembly. Still another alternative embodiment uses torque sensor and RF transmitter directly on Kelly drive bushing without utilization of intermediate bushing.

9 Claims, 7 Drawing Figures

INVENTOR
NORMAN D. DYER
ATTORNEY

INVENTOR
NORMAN D. DYER

William E. Johnson Jr.
ATTORNEY

3,664,184

ROTARY TORQUE INDICATOR FOR WELL DRILLING APPARATUS

BACKGROUND OF THE INVENTION

This invention generally relates to a torque indicator. More specifically, it relates to apparatus for monitoring torque applied through a rotary drilling machine to drill pipe.

In the drilling of oil and gas wells with rotary rigs, and in particular the drilling of deep wells, the drill pipe is subjected to considerable stress. The stress is imposed first by the weight of the drill string and, second, by the resistance of the strata to the rotating of the drill pipe and to the cutting by the drill bit in the different strata. If care is not taken to control the amount of torque imposed on the drill string, twist-offs may occur which will result in expensive fishing jobs.

While the art has devised various methods and apparatus for measuring rotary torque, such as measuring electrical current in drive motors and also as providing mechanical linkages to torque indicators, such prior art devices have never provided any degree of accuracy, or practicality in measuring the torque applied to the drill pipe.

It is therefore the primary object of this invention to provide a new and improved apparatus for monitoring rotary torque applied to drill pipe during the drilling of oil and gas wells;

It is another object of the invention to provide an electrical indication of rotary torque; and It is still another object of the invention to provide a torque indicator for use on rotary drilling rigs having no electrical or mechanical connections between the torque sensor and the torque indicator or recorder.

The objects are accomplished, broadly, by the use of one or more torque sensors mounted on the Kelly drive bushing, or, alternatively, on an intermediate bushing between the Kelly drive bushing and the rotary table, which in turn drive the input of an RF transmitter. An RF receiver thus provides an indication of the torque applied to the drill pipe. In one embodiment, the torque sensors are mounted on a two-part intermediate bushing between the Kelly drive bushing and the rotary table.

These and other objects of the invention will be more readily appreciated by those skilled in the art from a reading of the following detailed specification and drawing in which.

Figure 1:
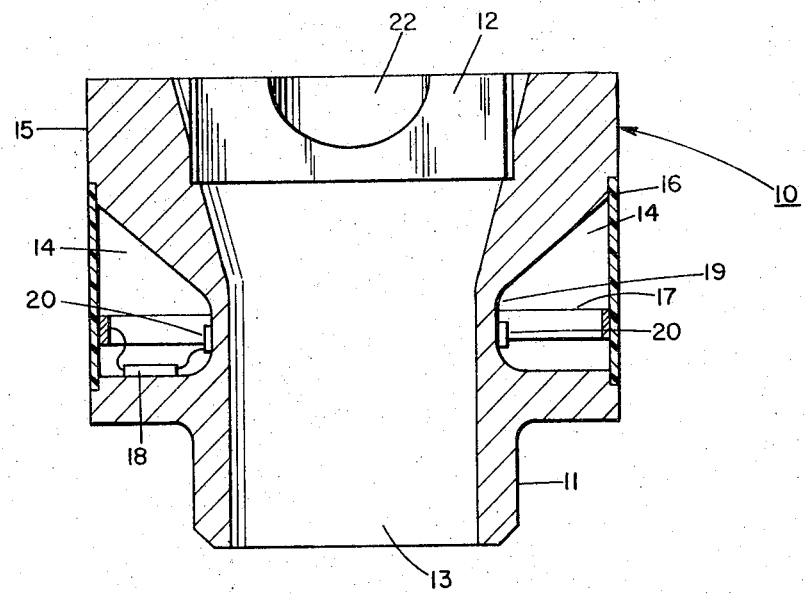
FIG. 1 is a side elevational view, partly in cross section, of a unitized adapter assembly according to the invention.

Referring now to the drawing in more detail, especially to FIG. 1, there is illustrated a unitized adapter assembly 10 having a male drive end 11 and a female socket 12 sized to receive a conventional Kelly bushing (not shown in this FIGURE). The male drive 11 is sized to fit into a square hole in a rotary table (also not shown in this FIGURE). Such Kelly drives and rotary tables are conventional to the oil well drilling industry, for example, as described and illustrated in U.S. Pat. No. 2,707,093 to R. R. Bloss et al. Although the Kelly bushing and the hole in the rotary table can be of various shapes, e.g., square, round or hexagonal, the square variety is used herein for purposes of illustration.

The center hollow portion 13 of the adapter assembly 10 is adapted to have a drill stem (not illustrated) pass therethrough.

A cavity 14 is circumferentially located about the lateral surface 15, with an RF-transparent skirt 16, for example, made of plastic, around the cavity 14 to keep dirt and mud out of the cavity. A transmitting antenna 17 is mounted on the inner side of the skirt 16. An RF transmitter 18 is mounted within the cavity 14, the output of which is connected to the antenna 17. It has been found that by using a battery-powered 91.75 MHz, amplitude modulated transmitter, commercially available from the Aerotherm Corporation in California, the signal can be received quite conveniently at 100 feet away from the transmitter. An RF receiver, preferably having a response of 88–108 MHz, has been found to work quite satisfactorily with this system.

Also mounted within the cavity is a standard two-element (or four-element) strain gauge bridge 20. The strain gauge elements are mounted on the lateral surfaces 19 of the cavity 14 such that the torque applied from the rotary table to the Kelly drive will be sensed by the strain gauge elements. In the two-element system, for example, one element can be strained and the other unstrained, or alternatively, the two elements can be oppositely strained.

The output of the strain gauge bridge 20 is connected to the input of the transmitter 18, whereby the signal received by the RF receiver (not illustrated) is indicative of the unbalancing of the strain gauge bridge, and hence, of the torque transmitted from the rotary table to the drill stem.

Although an amplitude modulated signal has been described, it will be appreciated that a frequency modulated signal or carrier is also contemplated by the present invention. It should also be appreciated that the strain gauge elements can be of several varieties, for example, wire resistors or semiconductor devices, to name but two. Furthermore, as is explained hereinafter, sensors other than strain gauges can be used, for example, a hydraulic cylinder between a pair of moving parts, to provide an indication of applied torque.

Figure 2:
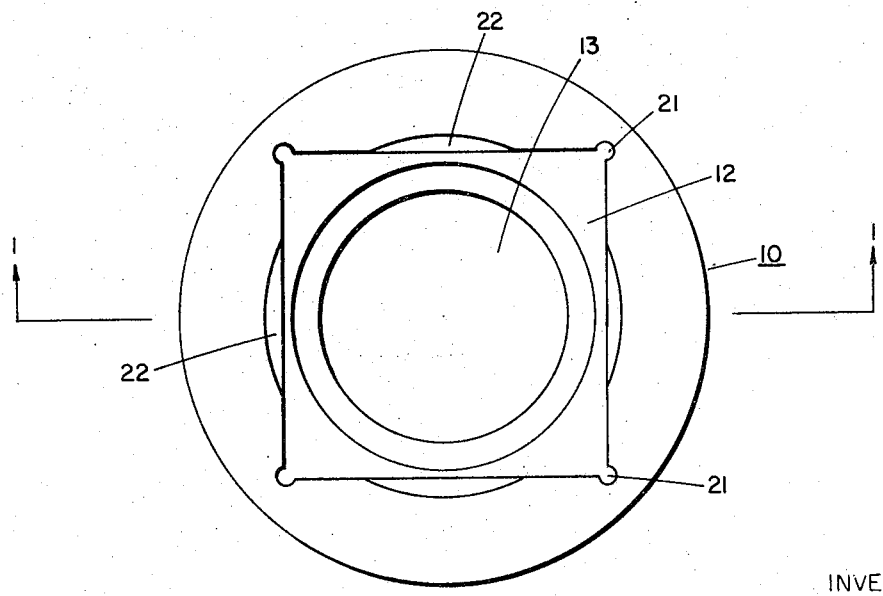
FIG. 2 is a top plan view of the adapter assembly according to FIG. 1.

FIG. 2 illustrates in plan view the adapter assembly according to FIG. 1. A relief portion 21 is formed in each of the four corners of the female socket 12. The cut-away portions 22 result from having formed the uppermost enlarged and tapered end of the center opening 13 prior to cutting the socket 12 in the adapter 10.

In operation of the adapter assembly 10 of FIGS. 1 and 2, the adapter 10 is first placed in the rotary table, the male drive end 11 fitting into a female socket of similar size in the rotary table. The Kelly drive bushing is then inserted into the female socket 12 of the adapter assembly. Thereafter, whenever torque is applied from the rotary table to the drill stem, the torque is sensed by the sensor 20, the output of which drives the transmitter 18. The antenna 17 then radiates the transmitted signal to a remote receiver, such signal being indicative of the torque applied from the rotary table to the drill stem.

Figure 3:
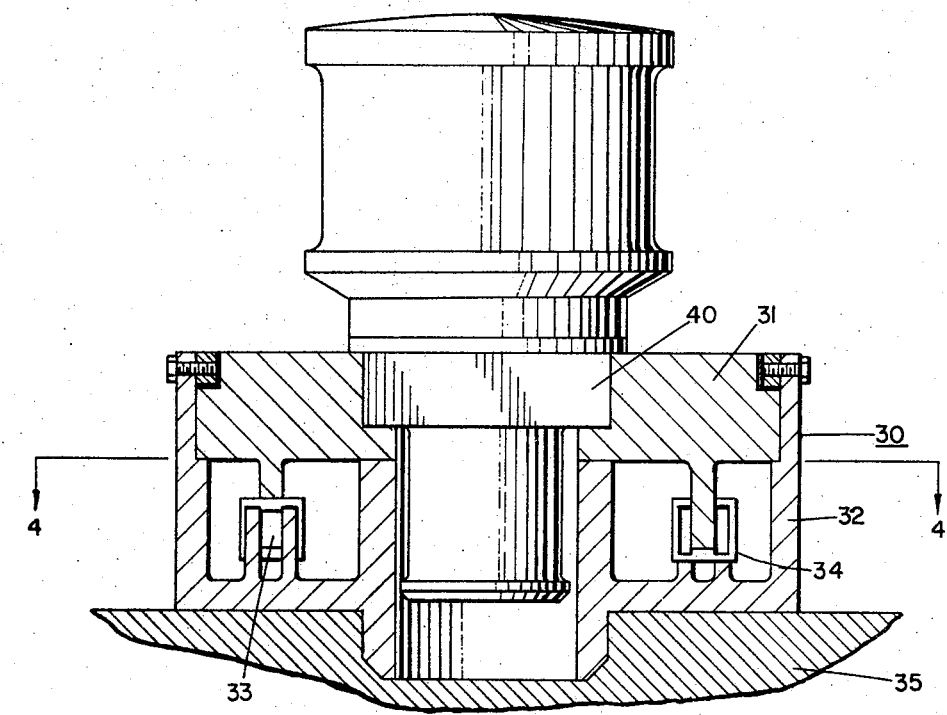
FIG. 3 is a side elevational view, partly in cross section, of a two-part adapter assembly according to the invention, showing additionally the position of the adapter assembly between the Kelly bushing and the rotary table.
Figure 4:
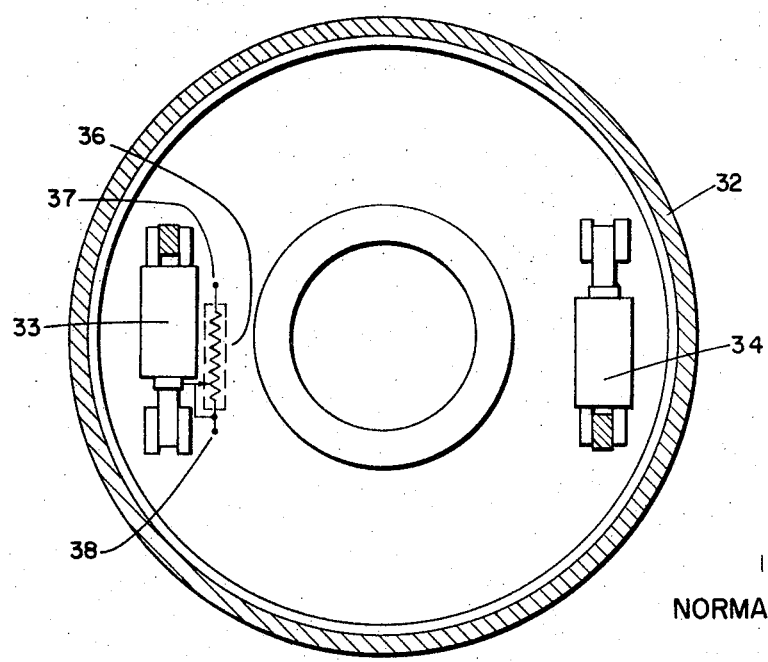
FIG. 4 is a plan cross sectional view of the adapter assembly of FIG. 3.

FIGS. 3 and 4 illustrate an alternative embodiment of an intermediate adapter assembly 30, wherein the assembly 30 has an upper part 31 and a lower part 32. A pair of hydraulic cylinders 33 and 34 join the upper and lower parts together, such that the application of torque from the rotary table 35 causes the hydraulic cylinders 33 and 34 to experience relative movement. A variable resistor 36 is illustrated schematically for purposes of converting the movement of the hydraulic cylinder 33 into an electrical signal. A similar such device can be attached to the hydraulic cylinder 34. The ends 37 and 38 of the variable resistor can thus be inserted in a bridge circuit in a manner much the same as in the strain gauge bridge previously discussed. Although not illustrated, such a bridge can then drive an RF transmitter as discussed with respect to FIGS. 1 and 2.

As further illustrated in FIG. 3, the conventional Kelly bushing 40 fits into the female socket of the two-part adapter assembly 30. Thus, as the rotary table 35 rotates, torque is passed through the adapter assembly 30, through the Kelly bushing 40 and the Kelly drive to the drill stem. As the torque is passed, the hydraulic cylinders 33 and 34 sense movement between the parts 31 and 32, such movement being indicative of the torque being applied to the drill stem. Such a torque sensor then drives an RF transmitter for remote reception.

Figure 5:
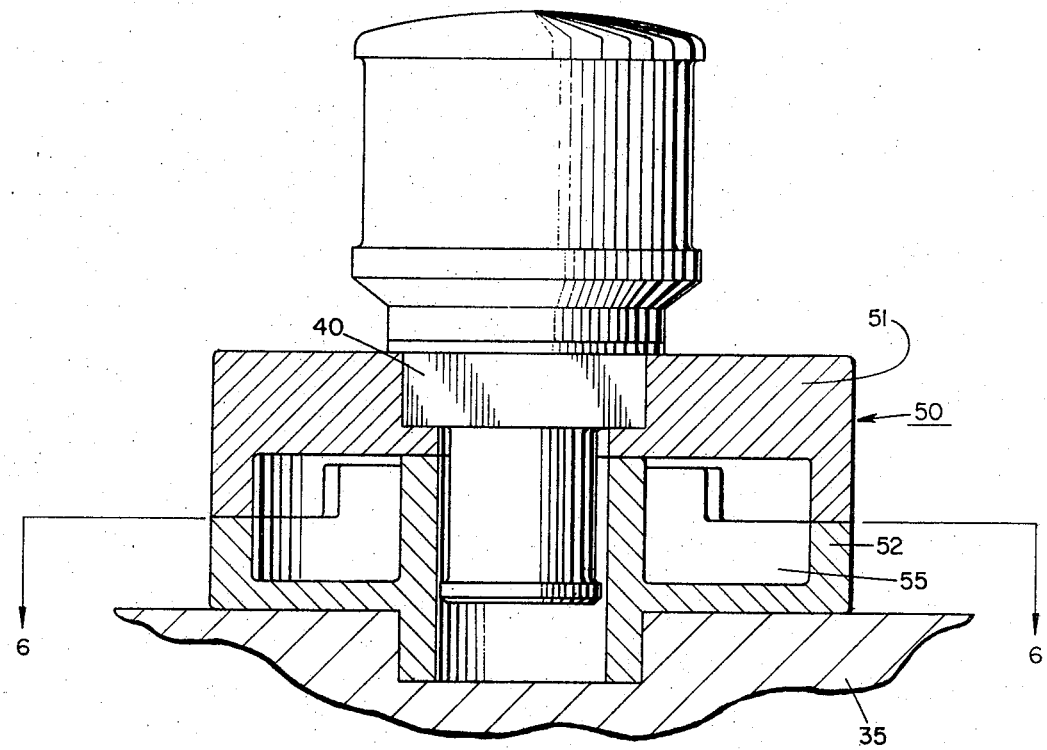
FIG. 5 is a side elevational view, partly in cross section, of an alternative two-part adapter assembly according to the invention.
Figure 6:
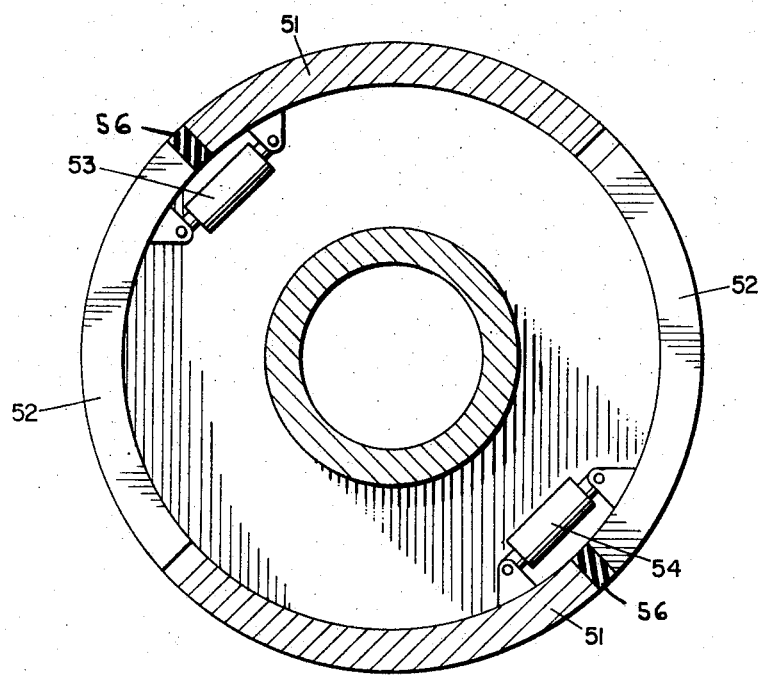
FIG. 6 is a plan cross sectional view of the adapter assembly of FIG. 5.

FIGS. 5 and 6 illustrate another embodiment of a two-part adapter assembly 50 having an upper part 51 and a lower part 52, the upper and lower parts having either a rubber portion 56, or alternatively, a spring mounted therebetween. A pair of hydraulic cylinders 53 and 54 are connected between the upper and lower parts to sense the relative movement between such parts and thus provide an indication of torque applied from the rotary table 35 through the adapter assembly 50, the Kelly bushing 40 and the Kelly drive to the drill stem. As previously discussed, the movement of one or more of the hydraulic sensors is easily converted to an electrical signal for driving an RF transmitter. Such a transmitter can be mounted within the cavity 55 located between the upper and lower parts 51 and 52, respectively.

Figure 7:
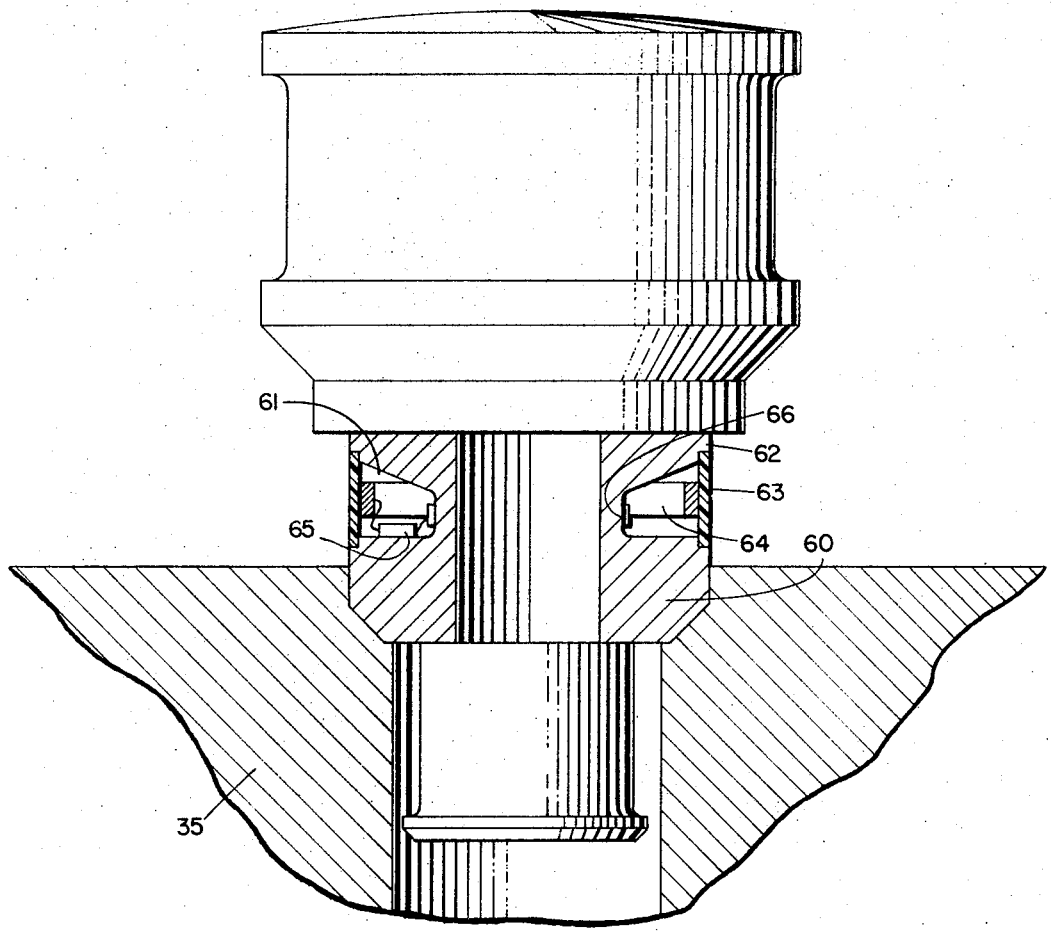
FIG. 7 is a side elevational view, partly in cross section, of an alternative embodiment of the invention wherein the torque sensor and RF transmitter are mounted directly on the Kelly drive bushing.

FIG. 7 illustrates the use of the principles of the present invention without the use of an intermediate adapter assembly as embodied within FIGS. 1–6. The Kelly bushing 60 is itself modified much in the manner of the intermediate adapter assembly 10 of FIGS. 1 and 2. A cavity 61 is circumferentially located about the lateral surface 62 of the Kelly bushing 60, with a plastic skirt 63 around the cavity 61 to keep dirt and mud out of the cavity and away from the sensors and associated RF equipment. A transmitting antenna 64 is mounted within the cavity 61, the output of which is connected to the antenna 64. As discussed with regard to FIG. 1, a battery powered transmitter 65 responsive to a torque sensor 66 is connected to the antenna 64 for transmission to a remote receiver.

Thus, without the use of an intermediate bushing or adapter assembly, the torque applied from the rotary table 35 to the drill stem is monitored by the modified Kelly bushing for transmission to a remote receiver, which quite conveniently can be located almost anywhere on or near the drilling platform.

While the preferred embodiments of the invention have been described and illustrated herein, those skilled in the art will appreciate and recognize modifications of such embodiments as are contemplated by the foregoing detailed descriptions and illustrations. For example, various other sensors and indications of such sensed torque can be utilized, such as pulse modulation, optical modulation, and the like. By way of specific example, a continuous spectrum light source can be used in lieu of the radio transmitter, the frequency or color of the light being a function of the sensed torque. With such a system, one or more color or frequency responsive receivers remote from the light source easily provide a remote indication of the torque between the rotary table and the drill stem.

The embodiments of the invention in which an exclusive property or privilege is described are defined as follows:

1. A torque indicating device adapted to embrace a Kelly bushing, comprising:
   a housing having a space therein adapted to receive said Kelly bushing and an outwardly extending member on said housing adapted to engage a rotary drilling table;
   at least one sensor mounted on said housing to measure torque applied by the rotary table through said housing to said Kelly bushing; and
   an RF transmitter mounted on said housing, the input of said transmitter being driven by said at least one sensor, whereby the output of said transmitter is indicative of the measured torque.

2. An adapter assembly for measuring torque applied from a rotary table to a Kelly bushing, comprising:
   a housing having a lower end adapted to fit into a rotary table for rotation thereby and a socket formed in the upper surface of said housing adapted to receive said Kelly bushing;
   at least one torque sensor mounted in said housing for sensing the torque applied from the rotary table to the Kelly bushing; and
   means for transmitting an indication of said torque to a location remote from said means.

3. The adapter assembly according to claim 2, including in addition thereto, a cavity in the lateral surface of said housing for mounting said torque sensor and said transmitting means.

4. The adapter assembly according to claim 3 wherein said transmitting means comprises an RF transmitter, and being further characterized by an RF-transparent skirt around said cavity.

5. The adapter assembly according to claim 4 wherein said at least one torque sensor comprises at least one strain gauge element.

6. The adapter assembly according to claim 2 wherein said at least one torque sensor comprises at least one hydraulic cylinder and piston combination and means to convert the movement of said piston in said cylinder into an electrical indication.

7. The adapter assembly according to claim 2, wherein said housing is comprised of a first part and a second part, and said at least one torque sensor is connected between said first and second parts.

8. The adapter assembly according to claim 7, wherein said at least one torque sensor comprises at least one hydraulic cylinder and piston combination, whereby the movement of the piston in said at least one cylinder is indicative of movement between said first and second parts.

9. The adapter assembly according to claim 8, being further characterized by means for converting the movement of said piston in said at least one hydraulic cylinder into an electrical indication.

* * * * *